United States Patent [19]
Knuth et al.

[11] Patent Number: 5,775,467
[45] Date of Patent: Jul. 7, 1998

[54] FLOATING ELECTROMAGNETIC BRAKE SYSTEM

[75] Inventors: Erik Forrest Knuth, Columbus; Abraham Shawky Farag, Dayton; William Frank Borchers, Beavercreek; Loren Emil Majersik, Oakwood, all of Ohio

[73] Assignee: General Motors Corporation, Detroit, Mich.

[21] Appl. No.: 688,696

[22] Filed: Jul. 29, 1996

[51] Int. Cl.⁶ .................. B60T 8/42; H02K 5/24
[52] U.S. Cl. .................. 188/161; 310/51; 310/103; 303/115.2
[58] Field of Search ............... 188/161, 171, 188/250 E, 264.6; 303/115.2; 267/136, 137, 140.13, 293, 153; 310/51, 103, 91

[56] References Cited

U.S. PATENT DOCUMENTS

| 3,763,968 | 10/1973 | Noly | 188/171 |
|---|---|---|---|
| 3,826,342 | 7/1974 | Noly | 188/171 |
| 4,425,813 | 1/1984 | Wadensten | 310/51 X |
| 4,488,700 | 12/1984 | Nakamura et al. | 310/51 X |
| 4,587,863 | 5/1986 | Wadensten | 310/51 X |
| 4,589,534 | 5/1986 | Apetrei | 192/18 B |
| 4,590,814 | 5/1986 | Wadensten | 310/51 X |
| 4,623,812 | 11/1986 | Van De Griend | 310/51 X |
| 4,684,838 | 8/1987 | Casanova | 310/93 |
| 4,718,523 | 1/1988 | Schneider et al. | 188/161 |
| 4,808,870 | 2/1989 | Gonda | 310/51 X |
| 5,000,523 | 3/1991 | Mikhaeil-Boules et al. | 303/115.2 |
| 5,112,116 | 5/1992 | Mikhaeil-Boules et al. | 303/115.2 |

FOREIGN PATENT DOCUMENTS 987101  3/1965  United Kingdom.

*Primary Examiner*—Peter M. Poon
*Attorney, Agent, or Firm*—Jeffrey A. Sedlar

[57] ABSTRACT

An electromagnetic brake system includes a motor having a rotor with a rotatable disk fixed to the rotor and an electromagnetic brake disposed about the disk to selectively prevent rotation of the rotor. The electromagnetic brake is carried on a resilient element so that it is suspended relative to the disk and isolated from the remainder of the system reducing the propagation of structural and airborne noise generated by actuation of the electromagnetic brake.

10 Claims, 6 Drawing Sheets

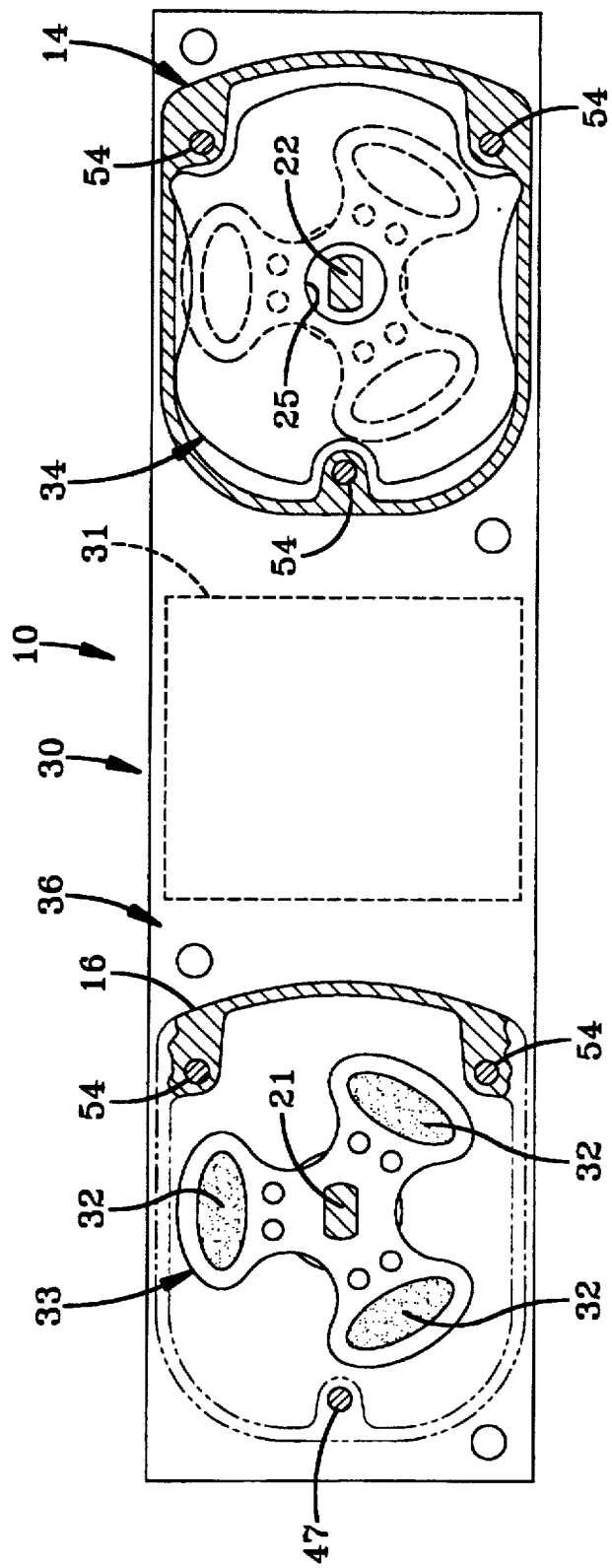
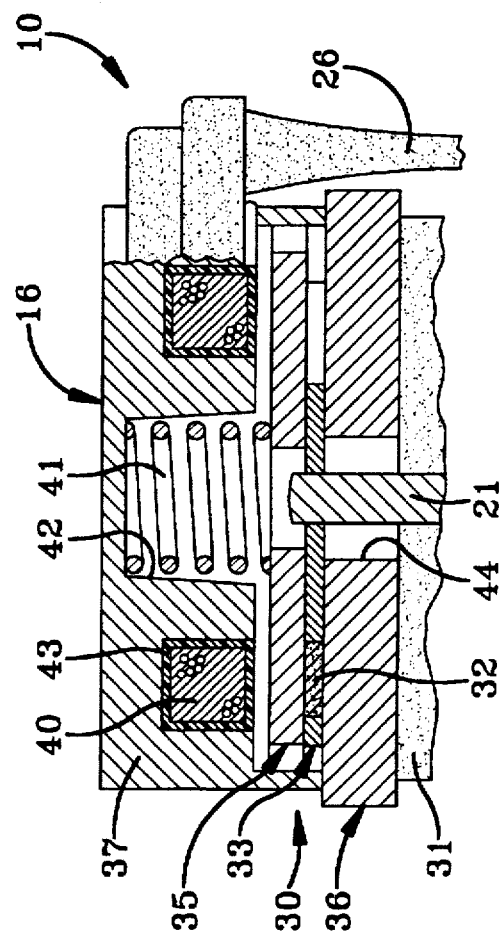
FIG-2
FIG-3

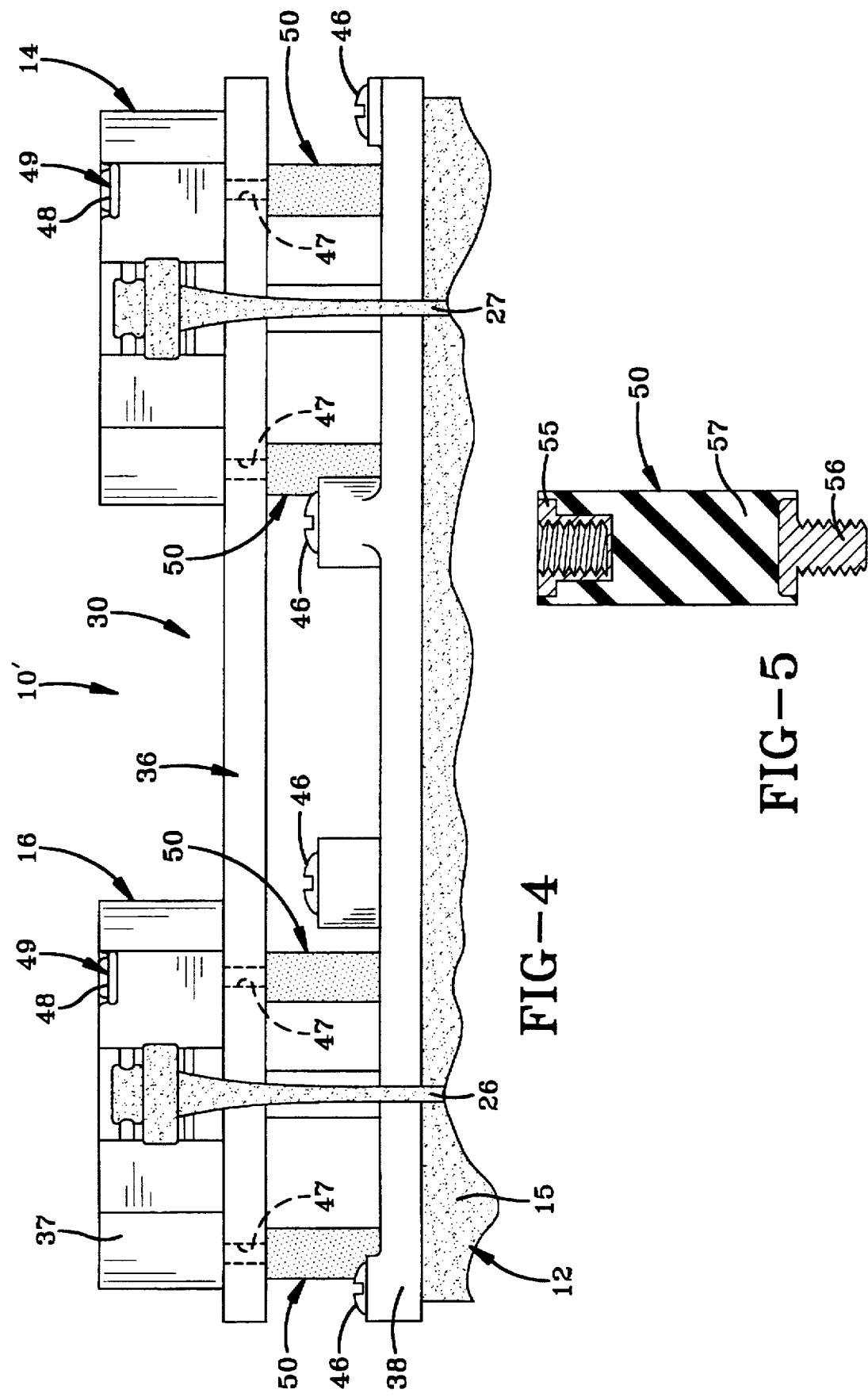

5,775,467

1

FLOATING ELECTROMAGNETIC BRAKE SYSTEM

BACKGROUND OF THE INVENTION

The present invention relates to electromagnetic brakes and more particularly, to a motor driven system including a floating electromagnetic brake that is operable to prevent rotation of the motor.

Motor driven systems that incorporate an electromagnetic brake to prevent rotation of the motor are known. One type of system that may incorporate an electromagnetic brake for a motor is a vehicle anti-lock brake system. A vehicle anti-lock braking system with an electromagnetic brake is described in U.S. Pat. No. 5,000,523 which issued Mar. 19, 1991.

That patent discloses an anti-lock braking system with a piston that is slidably mounted within a longitudinal bore. Movement of the piston provides a variable control volume that is in communication with a wheel brake to effect modulation of fluid pressure in actuating the wheel brake. A threaded nut is connected to the piston and the nut is slidably mounted within the longitudinal bore in a nonrotatable fashion. A power screw projects into the nut and is in threaded engagement therewith. The power screw is connected to a gear train and therethrough, to a reversible motor which powers the power screw and which is responsive to signals given to it by a controller.

As disclosed in U.S. Pat. No. 5,000,523 fluid pressure in the control volume can back drive the piston. Accordingly, this known undesirable effect was overcome by the addition of an electromagnetic brake that prevents back driving of the motor. The electromagnetic brake includes a disk that is connected to the end of the motor's rotor. A plunger is located above the disk and cooperates with the top surface of the motor housing to provide friction surfaces for engagement with the disk to restrain rotation thereof. This results in preventing undesirable movement of the piston within the longitudinal bore in response to fluid pressure in the control volume.

The plunger is biased by a coil spring to urge the friction surfaces into engagement with the disk. Above the disk is an electromagnetic coil which is responsive to a signal given by the controller to move the plunger to a position allowing for disengagement of the friction surfaces from the disk and thereby allowing movement of the piston within the longitudinal bore.

According to this prior art device the electromagnetic brake is actuated from its normally locked position whenever it is necessary to effect a change in the wheel brake pressure during every brake apply and release.

SUMMARY OF THE INVENTION

It has been found that with a vehicle anti-lock braking system having an electromagnetic brake, on brake apply action, the movable plunger of the electromagnetic brake contacts the motor's stator. It has also been found that during brake release action whereupon the electromagnetic brake is reengaged, the movable plunger contacts the motor's rotor and friction pads. These occurrences are repeated whenever it is necessary to effect a change in wheel brake fluid pressure which may occur upon every brake apply and release. It has also been found that these occurrences are audible at both the interior and exterior of the vehicle.

Having now identified a mechanically produced electromagnetic brake generated noise, it is an aim of the present invention to reduce the noise that is perceivable by the vehicle's occupants.

According to the present invention, a means of isolating the propagation path of the electromagnetic brake produced noise as close as practicable to the generation source is provided. The electromagnetic brake is mounted in a manner that creates a low pass filter in attenuating vibrations and reduces the amplitude of the impact generated noise while still providing rotational locking when needed. In particular, a significant reduction in amplitude of the mid and high frequency impact generated noise is achieved. As a result, when the electromagnetic brake's plunger moves, transmission of the generated vibration and resultant noise is attenuated by what is effectively a mechanical low pass filter.

According to a preferred embodiment of the present invention, an electromagnetic brake system includes a motor that has a rotor carried within a housing. A shaft rotates with the rotor and extends from the housing. A disk is carried by the shaft and is fixed to rotate in concert with the shaft. An electromagnetic brake is disposed about the disk. A coil is carried in the electromagnetic brake with a plunger disposed between the coil and the disk. A spring urges the plunger towards the disk and into normal engagement therewith. At least one resilient element is interposed between the housing and the electromagnetic brake wherein the electromagnetic brake is suspended on the housing. This results in a system wherein the electromagnetic brake is able to float on the at least one resilient element, relative to the housing and the disk.

In accordance with the aforementioned preferred embodiment, the resilient element results in a mechanical filter that in particular, reduces the transmission of high frequency vibrations and results in lower noise levels in the passenger compartment of an associated vehicle. By isolating the transmission of vibrations from the electromagnetic brake to the housing, airborne noise perceivable on the exterior of the vehicle is also decreased.

BRIEF DESCRIPTION OF THE DRAWINGS

FIG. 2 is a cross sectional illustration taken generally through the planes indicated by the stepped line 2—2 in FIG. 1.

FIG. 3 is a fragmentary cross sectional illustration taken generally through the plane indicated by the line 3—3 in FIG. 1.

FIG. 4 is a fragmentary elevation view of a motor pack assembly having dual electromagnetic brakes according to an alternative embodiment of the present invention.

FIG. 5 is a fragmentary cross sectional illustration of the grommets of FIG. 4.

DETAILED DESCRIPTION OF THE PRESENTLY PREFERRED EMBODIMENTS

Figure 1:
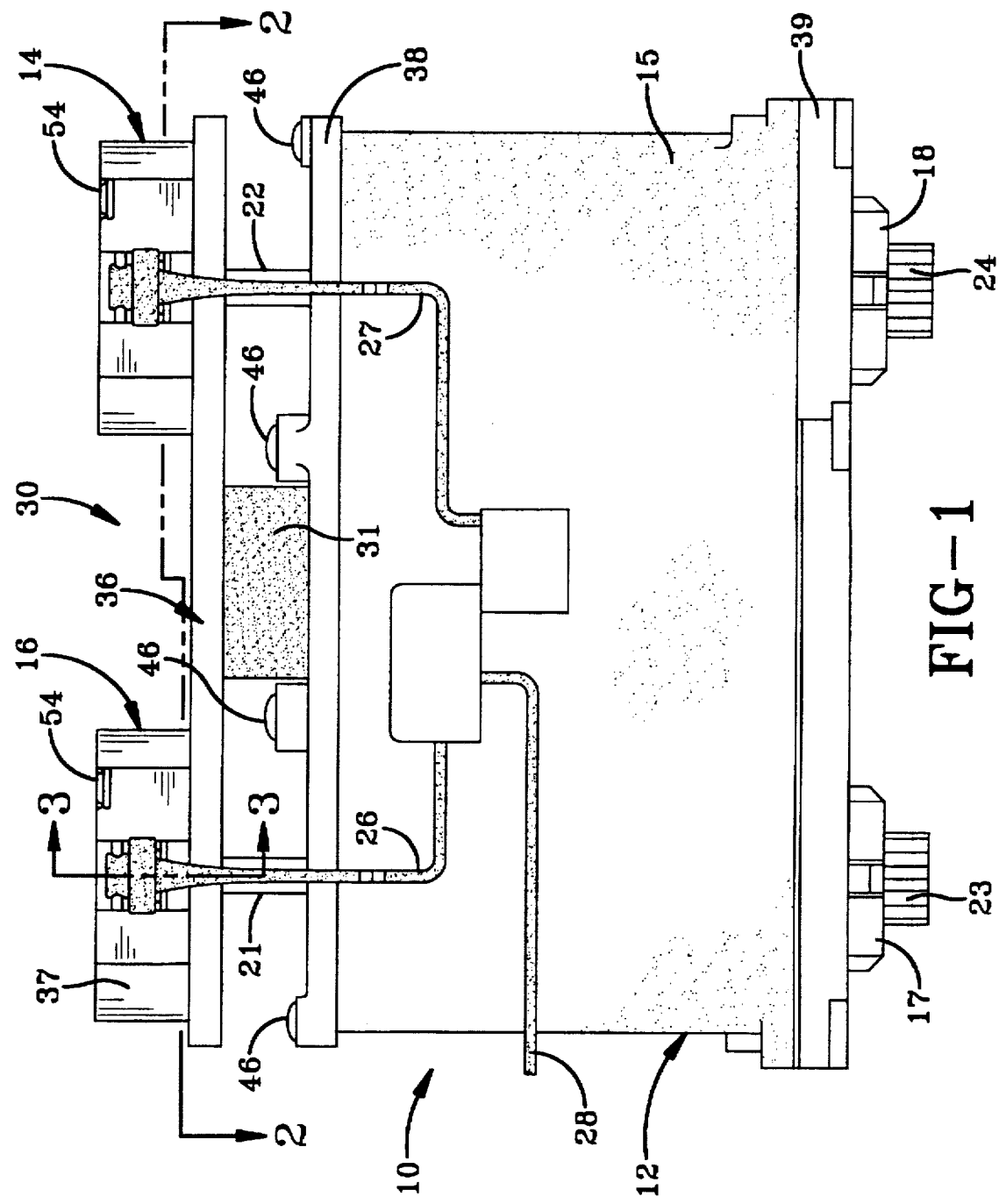
FIG. 1 is an elevation view of a motor pack assembly having dual electromagnetic brakes.

Referring to the drawings, illustrated in FIG. 1 is a motor pack including a floating electromagnetic brake system in accordance with the present invention and designated in the aggregate as 10. The motor and electromagnetic brake arrangement is similar to that disclosed in U.S. Pat. No. 5,000,523 which issued Mar. 19, 1991, is commonly assigned, and is specifically incorporated herein by reference.

Motor pack and electromagnetic brake assembly 10 includes a motor pack 12 with dual electrically driven motor assemblies 17 and 18 carried in a common housing 15. The motor 17 includes a rotating element rotatably supported by motor shaft 21. The motor shaft 21 supports an output gear 23 for power operation of an associated system for a purpose such as generating a selected fluid pressure in a closed loop brake circuit. Similarly, motor 18 includes a motor shaft 22 which is connected to an output gear 24. Electrical power and control signals are supplied to the motor pack 12 through electrical lead 28. The motor assembly is held together by a plurality of fasteners 46 which extend from the plate 38 to the plate 39 of motor pack 12.

A body 30 is supported on plate 38 solely by means of suspension element 31. Suspension element 31 is generally, a one-piece polyhedron. More specifically, suspension element 31 is a rectangular block-shaped soft rubber element that is bonded to the plate 38 and the body 30 at plate 36. optionally, the suspension element 31 is otherwise fastened to the plates 38 and 36 by a conventional ancillary device, rather than bonding.

The body 30, as suspended by the suspension element 31, carries electromagnetic brake assemblies 14 and 16. The motor shafts 21 and 22 extend through the plate 36 of body 30 into the electromagnetic brake assemblies 14 and 16. The electromagnetic brake assemblies 14 and 16 are supplied with electrical power through electrical leads 26 and 27.

Referring to FIG. 2, details of the electromagnetic brake assemblies 14 and 16 are illustrated. A cross section is shown through electromagnetic brake assembly 16 in a manner that clearly illustrates three-lobed rotor 33 which is fixed onto motor shaft 21 to rotate in concert therewith. The rotor 33 carries three pads 32, one in each lobe, which are formed of an acceptable friction material. The cross sectional view through electromagnetic brake assembly 14 discloses plunger 34 which is positioned over a rotatable disk (not visible in the present view), like rotor 33 which is fixed to rotate with motor shaft 22. Motor shaft 22 extends partially into a clearance opening 25 in plunger 34. Similarly, rotor 33 is covered by a plunger 35 as visible in FIG. 3.

Referring to FIG. 3, the rotor 33 is rotatably carried between plate 36 and plunger 35. The electromagnetic brake assembly 16 includes a ferromagnetic core 37 which is rigidly supported on the plate 36 and carries a coil 40 comprised of a plurality of turns of wire wound in bobbin 43. Concentric with the coil 40, the core 37 includes a cavity 42 that contains a spring 41 normally forcing the plunger 35 into engagement with the rotor 33. The pad 32 is forced into frictional contact with dual braking surfaces, one on the side of plunger 35 facing the rotor 33, and one on the side of plate 36 facing rotor 33. Accordingly, the electromagnetic brake assembly 16 normally applies a clamping load to rotor 33 as induced by spring 41 to frictionally inhibit rotation of the motor shaft 21.

The motor shaft 21 extends through a clearance opening 44 in the plate 36. The motor shaft 22 extends through a similar opening (not illustrated) in the plate 36. Therefore, the plate 36 is suspended solely on the suspension element 31 and accordingly, is allowed to "float" upon deflection of the suspension element 31 when the electromagnetic brakes 14 and 16 are released and applied.

It has been found that the motor shafts 21 and 22 do not require bearing surfaces in the openings through the plate 36, (e.g. opening 44). This is important in reducing the propagation paths between the electromagnetic brakes 14, 16 and the motor pack 12 which is connected to the associated vehicle's supporting structure. Accordingly, both transverse and longitudinal float of electromagnetic brakes 14 and 16 on the suspension element 31 is not restricted.

In order to allow rotation of the electric motors 17 and 18 the electromagnetic brake assemblies 14 and 16 are selectively energized in concert. The electromagnetic forces induced by the coils 40 in the core 37 overcomes the force of spring 41 deflecting the spring and causing the plunger 35 to move toward or against the core 37. This permits free rotation of the rotor 33 between the plate 36 and the plunger 35 allowing the motor shaft 21 to freely rotate.

Optionally, the plunger 35 is normally held away from the rotor 33 by the electromagnetic force which is selectively released to apply the electromagnetic brake. The present invention is also readily adaptable to electromagnetic force engagement of the brake with a spring positioned to normally hold the plunger away from the disk.

As the plunger 35 moves between the core 37 and the rotor 33 impact generated vibrations and noise are transferred to the electromagnetic brake assembly 16 and the plate 36. A similar occurrence results in the electromagnetic brake 14. Suspension element 31 inhibits the transfer of structural borne vibrations significantly reducing the effect of sound propagation through motor pack 12. The adhesive bonding of suspension element 31 to plate 36 provides a constrained surface on plate 36 that acts to suppress bending modes and the airborne noise caused by them.

Referring to FIGS. 4 and 5, an alternative embodiment of the present invention designated as 10' is illustrated. The plate 36 includes six openings 47 as seen in FIG. 2, which correspond in location to six fasteners 54 which extend through the core 37. In this embodiment, the six fasteners 54 are extended and are designated as fasteners 49. The fasteners 49 extend through the core 37 of body 30 and plate 36 of body 30 and are threaded into inserts 55 of grommets 50. Accordingly, the plate 36 is supported on the plate 38 by the six grommets 50.

The plate 36 is held between the threaded inserts 55 of grommets 50 and the heads 48 of fasteners 49. Plate 36 is suspended on plate 38 by means of the inserts 55 which are bonded to the soft rubber body 57 which is also bonded to the inserts 56. Similar to the suspension element 31 of the embodiment of FIGS. 1-3, the suspension elements of the embodiment of FIGS. 4 and 5, which each include inserts 55 and 56 and soft body 57, attenuates the transfer of structurally borne vibrations and noise from the electromagnetic brake assemblies 14 and 16 to the motor pack 12.

Figure 6:
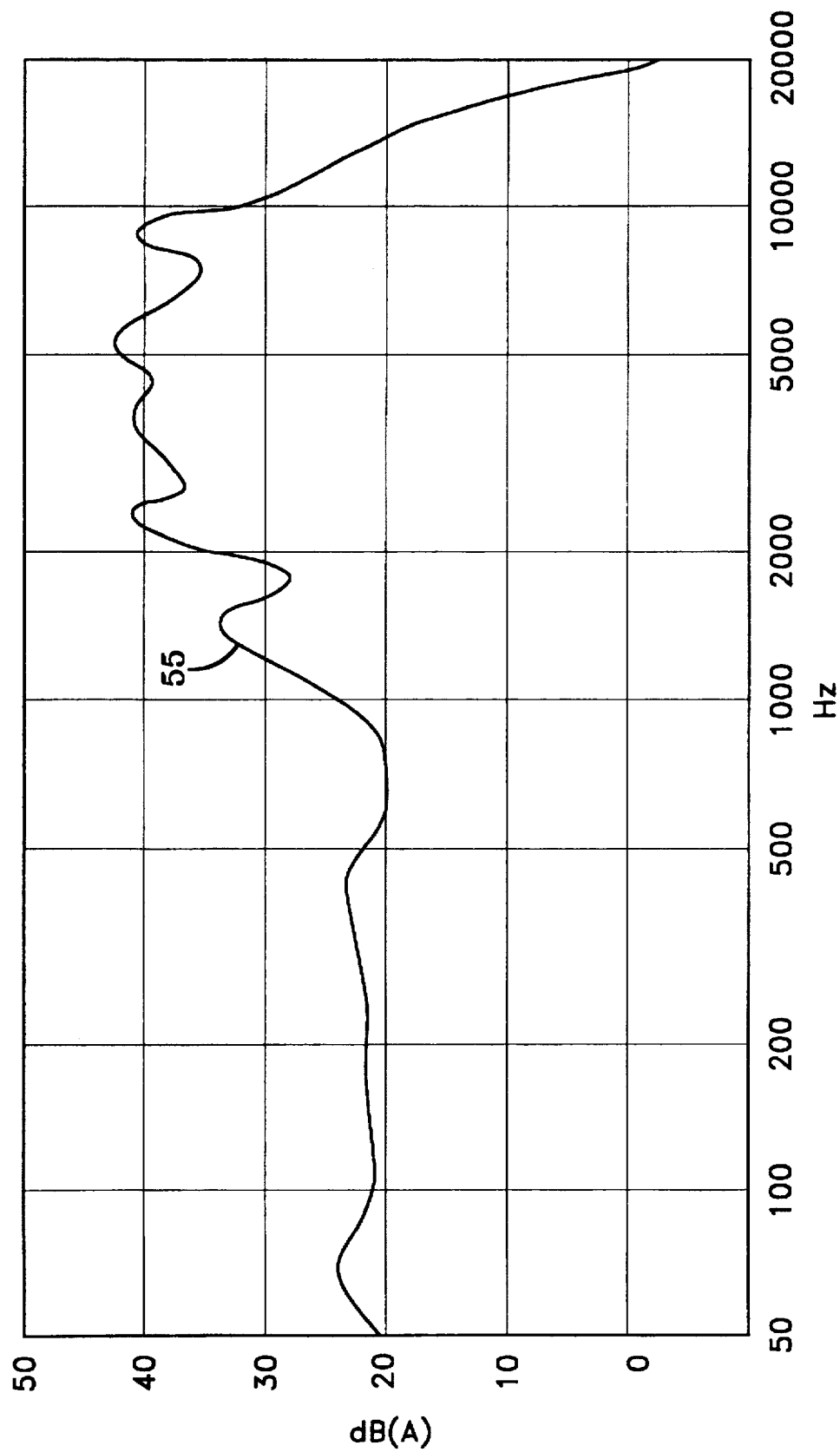
FIG. 6 is a graph of decibel level versus frequency for a prior art assembly.
Figure 7:
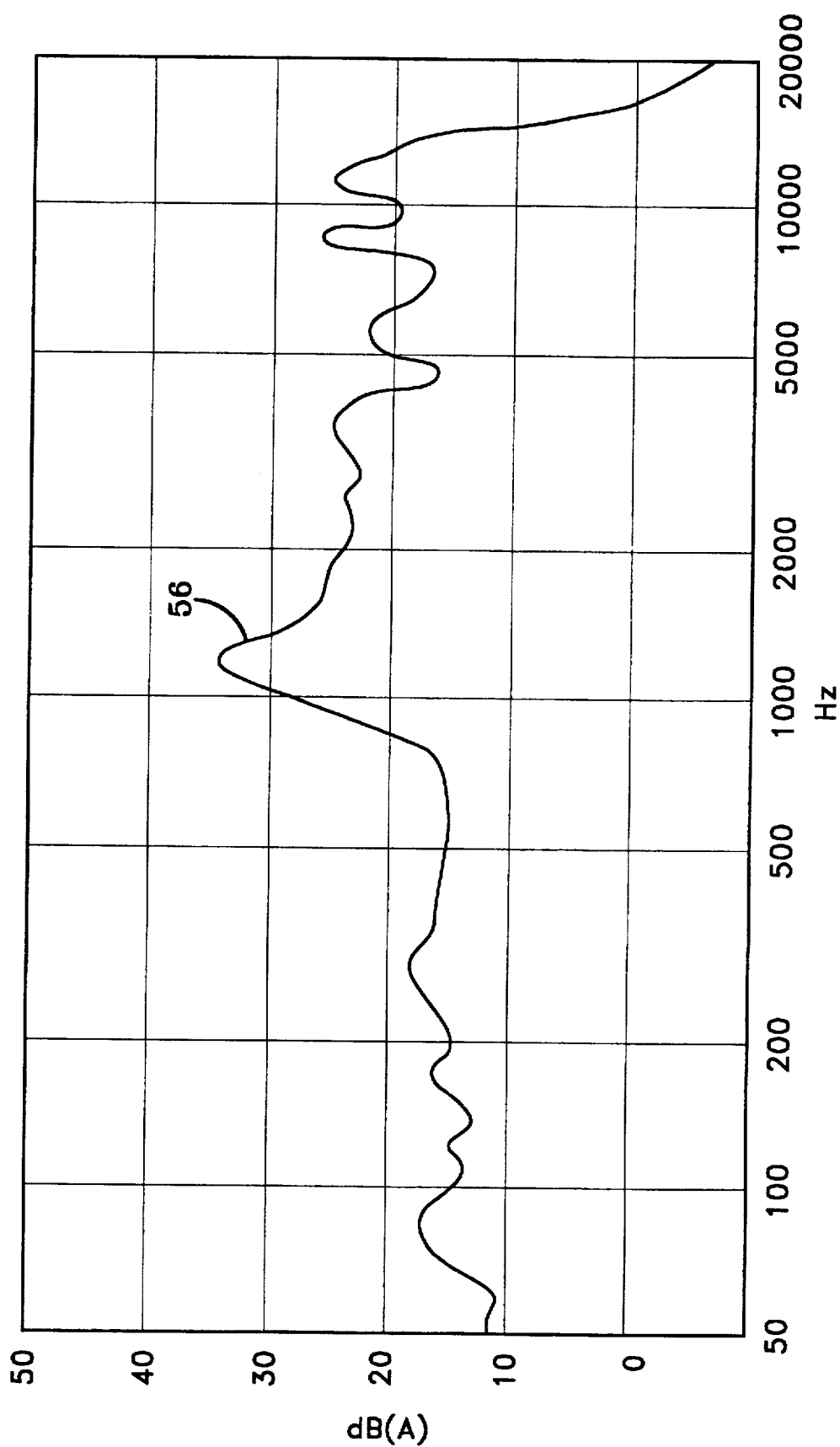
FIG. 7 is a graph of decibel level versus frequency for an assembly in accordance with the embodiment of the present invention illustrated in FIGS. 4 and 5.
Figure 8:
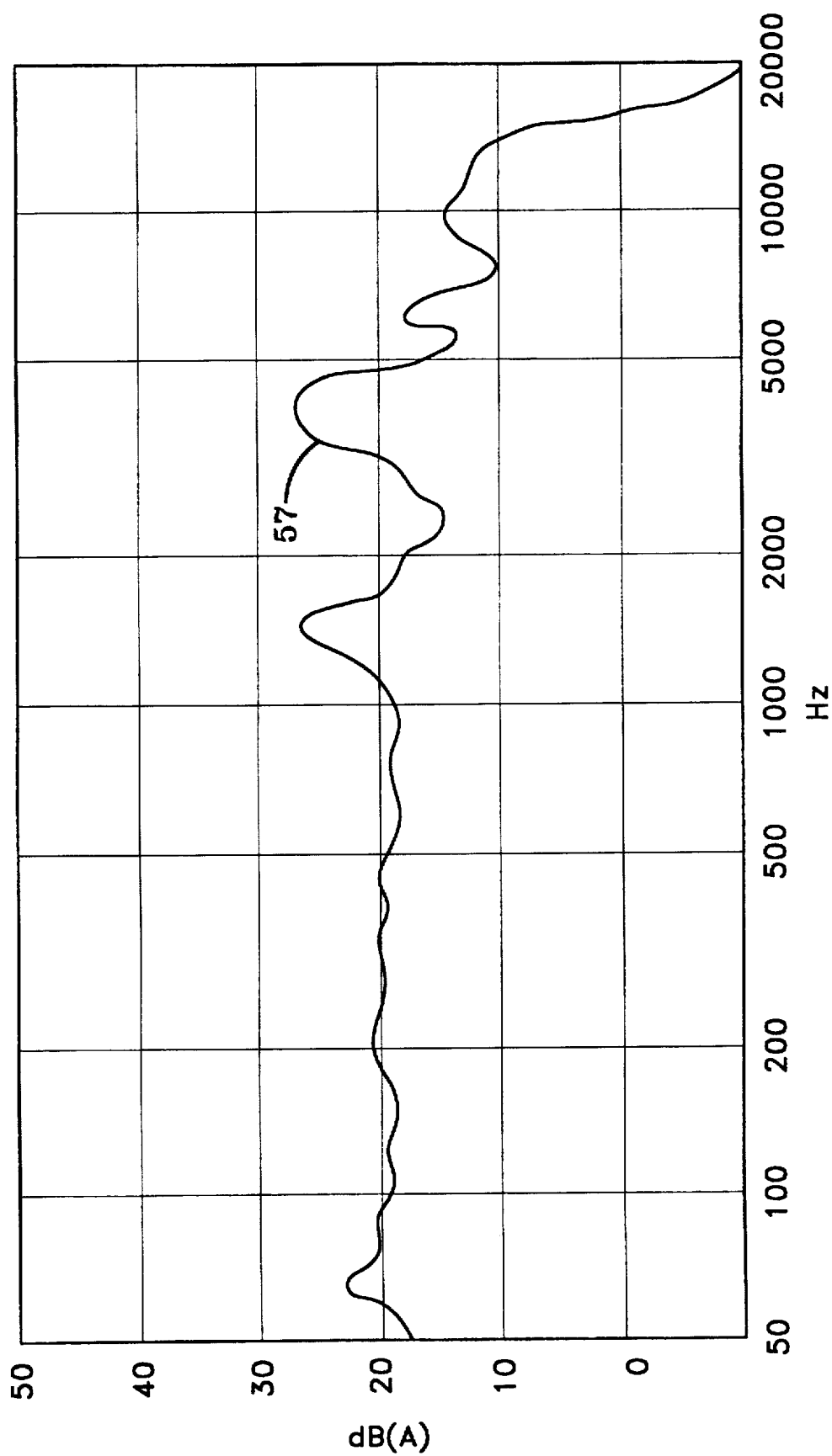
FIG. 8 is a graph of decibel level versus frequency for an assembly in accordance with the embodiment of the present invention illustrated in FIGS. 1-3.

The effect of the noise reduction techniques physically embodied in FIGS. 1 through 5 as compared to the prior art are graphically shown in FIGS. 6–8. FIGS. 6–8 graph sound level readings in decibels taken on the A-Weighted Scale over a frequency range of 50–20,000 Hertz. The graph of FIG. 6 demonstrates airborne sound levels generated by an electromagnetic brake system according to the prior art at curve 55. The graph of FIG. 7 demonstrates airborne sound levels generated by an electromagnetic brake system according to the embodiment of FIGS. 4 and 5 at curve 56. The graph of FIG. 8 demonstrates airborne sound levels generated by an electromagnetic brake system according to the embodiment of FIGS. 1–3 at curve 57. Curve 56 demonstrates a marked decrease in sound level, particularly at frequencies above 1000 Hertz, as compared to curve 55 of FIG. 6. Curve 57 shows an additional marked decrease in sound levels when compared to curve 56 of FIG. 7.

Sound levels in the lower frequency ranges remain relatively flat with the isolation devices of the present invention generally operating as low pass filters, most effectively blocking the transmission of higher frequencies. The significance of the noise reduction is demonstrated more fully when an average sound level of curves 55–57 is compared for the range between 500 and 10,00 hertz. The sound levels at the points corresponding to 500, 1000, 2000, 5000 and 10,000 Hertz were taken from the graphs of FIGS. 6, 7 and 8. These values are shown in the following table.

| Frequency (Hz.) | Figure 5 (dBA) | Figure 6 (dBA) | Figure 7 (dBA) |
|---|---|---|---|
| 500 | 22 | 16 | 19 |
| 1000 | 24 | 28 | 18 |
| 2000 | 35 | 24 | 17 |
| 5000 | 43 | 21 | 16 |
| 10000 | 33 | 19 | 14 |

The average of the decibel levels for the various selected frequencies is given by the equation:

$$L_{avg} = 10 * \text{Log}\left( 1/n * \sum_{i=1}^{n} 10 \text{ EXP } L_i/10 \right)$$

In this equation $L_{avg}$ is the average of the sound levels for the selected frequencies in dBA and $L_i$ is the individual sound level in dBA at the various selected frequencies. The average sound level for the selected frequencies of curve 55 demonstrated in FIG. 6 is given by:

$L_{avg}=10*\text{LOG}(\frac{1}{5}*10 \text{ EXP } 2.2+10 \text{ EXP } 2.4+10 \text{ EXP } 3.5+10 \text{ EXP } 4.3+10 \text{ EXP } 3.3)=37.1 \text{ } dBA.$ The average sound level for selected frequencies from the curve 56 shown in FIG. 7 is given by:

$L_{avg}=10*\text{LOG }(\frac{1}{5}*10 \text{ EXP } 1.6+10 \text{ EXP } 2.8+10 \text{ EXP } 2.4+10 \text{ EXP } 2.1+10 \text{ EXP } 1.9)=23.5 \text{ } dBA.$ The average sound level for the selected frequencies from curve 57 of FIG. 8 is given by:

$L_{avg}=10*\text{LOG }(\frac{1}{5}*10 \text{ EXP } 1.9+10 \text{ EXP } 1.8+10 \text{ EXP } 1.7+10 \text{ EXP } 1.6+10 \text{ EXP } 1.4)=17.1 \text{ } dBA.$ The differences between these selected average values is significant when it is recognized that a decrease of 3 dB is generally equivalent to a reduction in sound of 50 percent. The curves 55, 56 and 57 themselves demonstrate that the embodiments of the present invention operate to, in particular, attenuate the sounds generated at frequencies higher than 500 Hertz.

Additionally, sound level readings recorded during operation of electromagnetic brakes according to the prior art, the embodiment of FIGS. 4 and 5, and the embodiment of FIGS. 1–3, were taken inside the vehicle at the drivers seat, and outside the vehicle near the electromagnetic brake, (EMB). Results of these readings are demonstrated in the following table:

| Device | Inside(dBA) | Outside(dBA) |
|---|---|---|
| Prior Art EMB | 51 | 72 |
| Figure 4,5 EMB | 39 | 61 |
| Figure 1,2 EMB | 33 | 56 |

The effect of the attenuation provided by the embodiments of the present invention is that the total sound levels are reduced by 12 dBA inside the vehicle and 11 dBA outside the vehicle by the embodiment of FIGS. 4,5 as compared to the prior art. The total sound levels are reduced by 18 dBA inside the vehicle and 16 dBA outside the vehicle by the embodiment of FIGS. 1–3 over the prior art. This dramatic reduction in decibel levels results from a decrease in structural borne vibrations which, in turn, decreases the airborne noise generated by an electromagnetic brake and also from the damping effect provided by aspects of the present invention.

What is claimed is:

1. An electromagnetic brake system comprising:
    a motor having a rotor carried in a housing with a shaft extending from the housing and being rotatable with the rotor;
    a disk carried by the shaft and being fixed to the shaft to rotate in concert therewith;
    an electromagnetic brake disposed about the disk including a body, a coil carried by the body and a plunger disposed between the coil and the disk; and
    at least one resilient element interposed between the housing and the body wherein the body is suspended on the housing by the resilient element so that the electromagnetic brake floats on the resilient element relative to the housing and the disk.

2. An electromagnetic brake system according to claim 1 wherein the electromagnetic brake including the body, the coil and the plunger, floats on the at least one resilient element relative to the housing and the disk.

3. An electromagnetic brake system according to claim 1 wherein the at least one resilient element comprises an elastomeric block fixed between the housing of the motor and the body of the electromagnetic brake.

4. An electromagnetic brake system according to claim 1 further comprising a plurality of fasteners extending into the housing of the motor and into the body of the electromagnetic brake wherein the at least one resilient element comprises a plurality of grommets having a soft body with a pair of rigid mounting inserts carried between the motor and the body of the electromagnetic brake.

5. An electromagnetic brake system according to claim 2 wherein the electromagnetic brake floats both laterally and longitudinally relative to the motor shaft.

6. An electromagnetic brake system comprising:
    a motor pack including a first motor having a first shaft carrying a rotatable first rotor so that the first rotor is spaced away from the first motor and the motor pack including a second motor having a second shaft carrying a rotatable second rotor so that the second rotor is spaced away from the second motor;
    an electromagnetic brake assembly including a plate suspended on the motor pack by a resilient element, the electromagnetic brake assembly including a first plunger with a first spring biasing the first plunger toward the first rotor and a second plunger with a second spring biasing the second plunger toward the second rotor wherein the first plunger is operable to apply a clamping load to the first rotor to normally prevent rotation of the first rotor and wherein the second plunger is operable to apply a clamping load to the second plunger to normally prevent rotation of the second rotor;

a first electromagnetic coil selectively energizable to move the first plunger and allow rotation of the first motor; and a second electromagnetic coil selectively energizable to move the second plunger and allow rotation of the second rotor wherein when the first and the second electromagnetic coils are energized and deenergized, the transfer of noise from the electromagnetic brake assembly to the motor pack is attenuated by the resilient element.

7. An electromagnetic brake system comprising:

a motor pack including a first motor having a first continuous shaft carrying a rotatable first rotor so that the first rotor is spaced away from the first motor and the motor pack including a second motor having a second continuous shaft carrying a rotatable second rotor so that the second rotor is spaced away from the second motor;

an electromagnetic brake assembly including a plate suspended on the motor pack by a resilient element, the electromagnetic brake assembly including a first plunger with a first spring biasing the first plunger toward the first rotor and a second plunger with a second spring biasing the second plunger toward the second rotor wherein the first plunger is operable to apply a clamping load to the first rotor to normally prevent rotation of the first rotor and wherein the second plunger is operable to apply a clamping load to the second plunger to normally prevent rotation of the second rotor;

a first electromagnetic coil selectively energizable to move the first plunger and allow rotation of the first motor; and a second electromagnetic coil selectively energizable to move the second plunger and allow rotation of the second rotor wherein when the first and the second electromagnetic coils are energized and deenergized, the transfer of noise from the electromagnetic brake assembly to the motor pack is attenuated by the resilient element.

8. An electromagnetic brake system according to claim 7 wherein the resilient element includes a soft body bonded to a first rigid insert and a second rigid insert wherein the first rigid insert is fastened to the plate and the second rigid insert is fastened to the motor pack so that the plate can initially move longitudinally in a floating manner toward or away from the motor pack.

9. An electromagnetic brake system according to claim 7 wherein the electromagnetic brake generates an audible noise and wherein transmission of the audible noise is attenuated by over 10 dBA by the resilient element.

10. An electromagnetic brake system according to claim 7 wherein the first motor has a first output gear on an end of the continuous shaft opposite the first rotor and the second motor has a second output gear on an end of the second continuous shaft opposite the second rotor.

* * * * *